(12) United States Patent
Kalish

(10) Patent No.: US 10,945,033 B2
(45) Date of Patent: Mar. 9, 2021

(54) SYSTEM AND METHOD TO GENERATE A CUSTOMIZED, PARAMETER-BASED VIDEO

(71) Applicant: Idomoo LTD, Hod Hasharon (IL)

(72) Inventor: Danny Kalish, Raanana (IL)

(73) Assignee: IDOMOO LTD., Hod Hasharon (IL)

( * ) Notice: Subject to any disclaimer, the term of this patent is extended or adjusted under 35 U.S.C. 154(b) by 53 days.

(21) Appl. No.: 16/353,014

(22) Filed: Mar. 14, 2019

(65) Prior Publication Data

US 2019/0289362 A1 Sep. 19, 2019

Related U.S. Application Data

(60) Provisional application No. 62/642,799, filed on Mar. 14, 2018.

(51) Int. Cl.
| | |
|---|---|
| *H04H 60/56* | (2008.01) |
| *H04N 21/442* | (2011.01) |
| *H04N 21/466* | (2011.01) |
| *H04L 29/08* | (2006.01) |
| *G06K 9/00* | (2006.01) |
| *H04N 21/45* | (2011.01) |

(52) U.S. Cl.
CPC ... *H04N 21/44218* (2013.01); *G06K 9/00744* (2013.01); *G06K 9/00765* (2013.01); *H04L 67/22* (2013.01); *H04N 21/4532* (2013.01); *H04N 21/4666* (2013.01)

(58) Field of Classification Search
CPC ......... H04N 21/44218; H04N 21/4666; H04N 21/4532; H04N 21/458
USPC ........................................................ 725/12
See application file for complete search history.

(56) References Cited

U.S. PATENT DOCUMENTS 7,614,069 B2 * 11/2009 Stone ..................... H04N 5/765
725/87
7,813,822 B1 * 10/2010 Hoffberg ............ G06K 9/00369
381/73.1

(Continued)

*Primary Examiner* — Michael B. Pierorazio
(74) *Attorney, Agent, or Firm* — Browdy and Neimark, P.L.L.C.

(57) ABSTRACT

The present invention provides a method for customizing video based on viewer behaviors, by performing the following steps:
  receiving/preparing plurality variations of customized video related to one video template, wherein each video variation has different features including at least one of: different scenario scene, different characters, different style, different objects
  displaying plurality of video variations to plurality of viewers;
  tracking viewer behavior while watching the video and after watching the video, wherein the viewers are identified by their profile in relation to real time context parameters;
  grading viewer behavior based on predefined viewers target (behavior) criteria;
  training a neural network to select video variants having specific features per each video presentation of a specific customizable video template in relation to viewer profile and context parameters, for maximizing viewer behavior grading in relation to said video variant.
  applying said neural network to a given viewer profile to determine for specific video template the video features for maximizing viewer behavior grading;
  streaming the determined a video based on determined video features.

20 Claims, 13 Drawing Sheets

(56) References Cited

U.S. PATENT DOCUMENTS

| | | | | |
|---|---|---|---|---|
| 8,032,911 B2* | 10/2011 | Ohkita | H04L 12/282 | 370/402 |
| 8,121,706 B2* | 2/2012 | Morikawa | H04L 12/2814 | 340/4.3 |
| 8,949,923 B2* | 2/2015 | Muvavarirwa | H04N 21/43615 | 725/139 |
| 2003/0056093 A1* | 3/2003 | Huitema | H04L 61/15 | 713/156 |
| 2004/0117856 A1* | 6/2004 | Barsoum | H04N 7/17318 | 725/138 |
| 2005/0216942 A1* | 9/2005 | Barton | H04N 21/43632 | 725/97 |
| 2005/0283815 A1* | 12/2005 | Brooks | H04N 21/6118 | 725/126 |
| 2005/0289632 A1* | 12/2005 | Brooks | H03H 7/461 | 725/126 |
| 2006/0010481 A1* | 1/2006 | Wall | H04N 21/4122 | 725/151 |
| 2006/0212197 A1* | 9/2006 | Butler | B60R 11/0235 | 701/36 |
| 2006/0225105 A1* | 10/2006 | Russ | H04N 21/44016 | 725/78 |
| 2007/0050822 A1* | 3/2007 | Stevens | H04N 21/4788 | 725/74 |
| 2007/0079341 A1* | 4/2007 | Russ | H04L 12/282 | 725/89 |
| 2007/0101185 A1* | 5/2007 | Ostrowka | H04N 21/4433 | 714/6.13 |
| 2007/0130601 A1* | 6/2007 | Li | H04N 21/2225 | 725/112 |
| 2007/0157281 A1* | 7/2007 | Ellis | H04N 7/17309 | 725/134 |
| 2007/0271518 A1* | 11/2007 | Tischer | H04N 21/44222 | 715/744 |
| 2007/0271580 A1* | 11/2007 | Tischer | H04N 21/4532 | 725/35 |
| 2008/0013919 A1* | 1/2008 | Boston | G11B 19/00 | 386/291 |
| 2008/0022330 A1* | 1/2008 | Barrett | H04N 21/4583 | 725/89 |
| 2008/0022331 A1* | 1/2008 | Barrett | H04N 21/4334 | 725/89 |
| 2008/0022332 A1* | 1/2008 | Barrett | H04N 21/4334 | 725/89 |
| 2008/0155615 A1* | 6/2008 | Craner | H04N 21/4751 | 725/91 |
| 2008/0235587 A1* | 9/2008 | Heie | H04N 7/142 | 715/719 |
| 2008/0235733 A1* | 9/2008 | Heie | H04N 7/17318 | 725/46 |
| 2009/0162032 A1* | 6/2009 | Patel | H04N 21/4627 | 386/252 |
| 2010/0107186 A1* | 4/2010 | Varriale | H04H 60/23 | 725/31 |
| 2010/0263013 A1* | 10/2010 | Asakura | H04N 21/4333 | 725/116 |
| 2010/0296487 A1* | 11/2010 | Karaoguz | H04W 84/045 | 370/332 |
| 2010/0313226 A1* | 12/2010 | Cholas | H04N 21/4126 | 725/92 |
| 2011/0066744 A1* | 3/2011 | Del Sordo | H04N 21/235 | 709/231 |
| 2011/0086619 A1* | 4/2011 | George | H04M 1/72533 | 455/414.1 |
| 2011/0107379 A1* | 5/2011 | Lajoie | H04L 65/1016 | 725/87 |
| 2011/0191810 A1* | 8/2011 | Thomas | H04N 7/106 | 725/81 |
| 2012/0230649 A1* | 9/2012 | Craner | H04N 5/76 | 386/230 |
| 2013/0198787 A1* | 8/2013 | Perry, II | H04N 21/4524 | 725/86 |
| 2017/0109584 A1* | 4/2017 | Yao | H04N 21/4666 | |
| 2018/0150704 A1* | 5/2018 | Lee | G06K 9/00805 | |
| 2019/0108618 A1* | 4/2019 | Hwang | G06N 3/084 | |
| 2019/0222891 A1* | 7/2019 | Shen | H04N 21/25875 | |
| 2020/0196024 A1* | 6/2020 | Hwang | G06T 1/20 | |

* cited by examiner

Data acquisition module 100

> Obtaining a customizable video template from a promoter. Storing the said template on the video templates database 2000.    110

> Obtaining viewer target definitions from the promoter, per each video template.    120
> Said viewer targets definition may include, for example:
> - clicking on hyperlinks;
> - creating contacts by messages;
> - Conducting a phone call;
> - engagement action such as registering for service;
> - performing a reservation or placing an order; and
> - purchasing a product or a service.
>
> Storing said viewer target definitions on the video templates database 2000.

> Interfacing a web browser or application 30 upon which the generated video is presented    130

> Obtaining viewer profile information from the machine hosting the said web browsers or application 30 (e.g. via cookies or forms). Storing the acquired viewer profile data on the viewer profile database 2300.    140

> Optionally interfacing external data sources 20 (e.g.: websites, CRM servers, telephone services etc.)    150

> Optionally obtaining presentation context parameters relevant to the location and timing of the video presentation (e.g. time of day, country, outdoor temperature), either from said external sources 20 or said web browsers or application 30.    160
> Storing the acquired presentation context parameters data on the viewer profile database 230.

Figure 2

Behavior tracking module 200

Interfacing a web browser or application 30 upon which the generated video is presented   210

Monitoring user behavior during the video presentation (attentiveness).   220

For example:
•Determine whether the viewer has seen the presented video to its fruition, or whether they have stopped the presentation in the middle
•Determine whether the viewer has generated much mouse and keyboard activity, indicating disinterest in the presented video.

Monitoring user actions on the website or application after viewing the video (responsiveness). Ascertaining whether specific targets, as defined above, have been performed by a specific viewer on the web browser or application 30 upon which the generated video is presented.
                                                                                                                                230
For example, ascertaining whether a viewer clicked a hyperlink to a promoter's landing page.

Optionally interfacing external data sources 20 (e.g.: websites, CRM servers, telephone services etc.) to ascertain whether specific targets, as defined above, have been performed by a specific viewer.
                                                                                                                                240
For example, ascertaining whether a viewer has registered for a specific service by monitoring the promoter's CRM customers' database.

Propagating said data to the behaviour analysis module   250

Figure 3

Behavior analysis module 300

Receiving viewer attentiveness and responsiveness data from the behaviour tracking module
310

Receiving the viewer target definitions per each video template from the video template database.
320

Analyzing the monitored behavioural data to ascertain the viewer's responsiveness and attentiveness to the video, in relation to said predefined video targets
330

Grading the video variation according to the viewer's behaviour, in view of the predefined viewer target definitions, henceforth referred to as "Behavior grade".
340

Maintaining said behaviour grading adjoined to the video variation in the Video variant database 2100
350

Statistically analyzing the effect of each video feature variation on the viewer's attentiveness, and responsiveness.
360

Figure 4 designated neural network module 400 – training stage

---

The designated neural network is trained to select optimal video variants per each presentation of a specific customizable video template.
It is also optionally trained to select optimal video features' customization values per each presentation of said specific customizable video template.

---

Receiving a set of video variants relating to a specific customizable video template from the video variant generation module 700          410

---

Receiving input pertaining to a specific video variant, including at least part of:
• designated video features (e.g. scenes, objects and sounds) comprising the video sequence, that are customizable for specific video templates.
• customization values that are applied to said video features          420

---

Receiving input pertaining to the presentation of the specific video variant, including at least part of:
• Viewer profile information          430
• Presentation context parameters

---

Receiving the behaviour grading pertaining to the presentation of the specific video variant to specific viewers from the behavior analysis module 300.          440

---

Training the designated neural network to select an optimal video variant for the specific customizable video template, per each presentation:          450

• Receiving the behaviour grading as feedback in relation to each presentation (i.e. in relation to the video variant, the viewer profile and the presentation context parameters );
• Adjusting the weighted values according to said feedback; and
• Selecting an optimal video variant, to produce maximal behaviour grading in relation to each presentation, according to the specific viewer's profile and the presentation context parameters.

---

Optionally training the designated neural network to select a set of optimal video features' customization values per each presentation:
          460

• Obtaining the said selected optimal video variant per each viewer's profile and presentation context parameters.
• Extracting a set of optimal video features' customization values per specific viewers' profile and presentation context parameters, according to the said selected optimal video variant .

Repeating the same process with all video variants of a specific customizable video template.          470

Figure 5 designated neural network module 400 - active stage

Receiving input pertaining to a specific customizable video template, including at least part of:
- Video features (e.g. scenes, objects and sounds comprising the video sequence)
- customization values that are applicable to said video features (e.g. scene shot at the beach or on a mountain)  470

Receiving input pertaining to the specific video presentation, including at least part of:  480
- Viewer profile information
- Presentation context parameters Selecting an optimal video variant per each presentation.

The said selection of optimal video variant enables the system to produce maximal behaviour grading in relation to each presentation of the said specific video template, in respect to the specific viewer's profile and the presentation context parameters.  485

Optionally s extracting, from the said selected optimal video variant an optimal set of video features' customization values per each presentation of the said specific customizable video template  490

Receiving behaviour grading from the behaviour analysis module 300 as feedback, and iteratively adjusting the neural network to refine the selection of video features' customization values per each presentation.  495

Figure 6

Generic neural network module 500 – training stage

The generic neural network is trained to select optimal video features' customization values per each presentation of any customizable video template.

Receiving a set of video variants relating to a specific customizable video template from the video variant generation module 700       510

Receiving input pertaining to a specific video variant, including at least part of:       520
•Generic video features (e.g. scenes, objects and sounds) comprising the video sequence, that are customizable for all customizable video templates.
•customization values that are applicable to said video features.

Receiving input pertaining to the video presentation, including at least part of:       530
•Viewer profile information
•Presentation context parameters Receiving the behaviour grading pertaining to the presentation of a video variation to specific viewers from the behavior analysis module 300.       540

Repeating the same process with multiple video variants of a specific customizable video template.       550

Repeating the steps described above, with multiple customizable videos.       560

Training the generic neural network to select a set of optimal video features' customization values per each presentation:       570

•Receiving the behaviour grading as feedback in relation to each presentation (i.e. in relation to the video variant, the viewer profile and the presentation context parameters );
•Adjusting the weighted values according to said feedback; and
•Selecting optimal video features' customization values , to produce maximal behaviour grading in relation to each presentation, according to viewers' profile and presentation context parameters.

Figure 7 generic neural network module 500 - active stage

Receiving input pertaining to a specific customizable video template, including at least part of:
- Video features (e.g. scenes, objects and sounds comprising the video sequence)
- customization values that are applicable to said video features (e.g. scene shot at the beach or on a mountain)   575

Receiving input pertaining to the video presentation, including at least part of:   580
- Viewer profile information
- Presentation context parameters Selecting an optimal set of video features' customization values per each presentation.   585
The said selection of optimal set of video features' customization values would utilize the trained generic neural network to produce maximal behaviour grading in relation to each presentation, in respect to the specific viewer's profile and the presentation context parameters.

Receiving behaviour grading from the behaviour analysis module 300 as feedback, and iteratively adjusting the generic neural network to refine the selection of video features' customization values per each presentation.   590

Figure 8

Generic personal neural network module 500A – training stage

The generic peronal neural network is trained to select optimal video features' customization values per each presentation of any customizable video template for specific user.

Receiving a set of video variants relating to a specific customizable video template from the video variant generation module 700                                                                                           510A Receiving input pertaining to a specific video variant and specific user, including at least part of:
    520A
•Generic video features (e.g. scenes, objects and sounds) comprising the video sequence, that are customizable for all customizable video templates.
•customization values that are applicable to said video features.

Receiving input pertaining to the video presentation for specific user, including at least part of:
    530A

•Presentation context parameters

Receiving the behaviour grading pertaining to the presentation of a video variation to specific viewer from the behavior analysis module 300.                                                                              540A Repeating the same process with multiple video variants of a specific customizable video template.
    550A Repeating the steps described above, with multiple customizable videos.                               560

Training the generic-personal neural network to select a set of optimal video features' customization values per each presentation for specific user :
    570

•Receiving the behaviour grading as feedback in relation to each presentation (i.e. in relation to the video variant, the the presentation context parameters );
•Adjusting the weighted values according to said feedback; and
•Selecting optimal video features' customization values, to produce maximal behaviour grading in relation to each presentation, according to viewers' profile and presentation context parameters.

Figure 9 generic personal neural network module 500A - active stage

Receiving input pertaining to a specific customizable video template, including at least part of:
- Video features (e.g. scenes, objects and sounds comprising the video sequence)
- customization values that are applicable to said video features (e.g. scene shot at the beach or on a mountain)         575A Receiving input pertaining to the video presentation for specific user, including at least part of:
                    580A

- Presentation context parameters

Selecting an optimal set of video features' customization values per each presentation.   585A
The said selection of optimal set of video features' customization values would utilize the trained generic personal neural network to produce maximal behaviour grading in relation to each presentation, in respect to the specific user and the presentation context parameters.

Receiving behaviour grading from the behaviour analysis module 300 as feedback, and iteratively adjusting the generic personal neural network to refine the selection of video features' customization values per each presentation for the specific user.
                    590A

Figure 10

Video variant generation module 700

Obtaining a customizable video template from the video templates DB 2000. 710

Receiving input pertaining to a specific customizable video template, including at least part of:
- Video features (e.g. scenes, objects and sounds)
- customization values that are applicable to said video features 720

Producing a set of video variants relating to said customizable video template, during the neural networks' (400, 500) training stage. 730

Propagating said set of video variants to the designated neural network module 400 during the designated neural network's training stage.
740

Propagating said set of video variants to the generic neural network module 500 during the generic neural network's training stage. 750

Figure 11

Video real-time module 600

The video real time module 600 displays a personalized video to a specific viewer. It may be configured to do either one of the following:

- Present a selected video variant from the designated neural network module 400,
- Generate a personalized video according to a customizable video template and set of video features' customization values selected by the designated neural network module 400,
- Generate a personalized video according to a customizable video template and set of video features' customization values selected by the generic neural network module 700, or
- Generate a personalized video according to a customizable video template and set of video features' customization values selected by the generic personal neural network module 700
- A combination of the above During the system's operation in training mode:

Receiving a randomly selected customized video from the video variant generation module 700.
610

Interfacing the web browser or application 30 to present the said video variant to a viewer.
620

Figure 12

Video real-time module 600 (continued)

During the system's operation in active mode:

Receiving the customizable video template, and the definition of video features as designated or generic from the video templates DB 2000.
630

Receiving a selected video variant from the designated neural network module.
635

Receiving a selected set of video features' customization values per each of the video template's generic video features, from the generic neural network module 700. 640

Optionally receiving a selected set of video features' customization values per each of the video template's designated video features, from the designated neural network module 400. 645

Applying a set of predefined rules relating to statistical parameters, to select the video features' customization values among the said set of designated and generic video features' customization values. 650

Optionally selecting a customized video variant from the video variant generation module 700 according to the said selected video features' customization values. 655

Optionally generating a customized video according to the said received customizable video template and the said selected video features' customization values. 660

Interfacing the web browser or application 30, to present the personalized video variant. The personalized video may be presented as a stream of video data, or a downloadable file. 665

Figure 13

SYSTEM AND METHOD TO GENERATE A CUSTOMIZED, PARAMETER-BASED VIDEO

BACKGROUND

Technical Field

The present invention relates generally to generation of customized, parameter-based videos for a given user profile, so as to maximize a user's response and interaction with the video. Users may be able to more easily relate to some versions of videos, such as ones that correspond to their identity, and this can be done by customizing a video to tailor to the particular user's profile.

SUMMARY

Users may find it easier to relate to some versions of videos, such as ones that correspond with their identity and preferences. The present invention provides a method for customizing video sequences according to particular users' profile parameters, so that each user could see a video that is directly tailored for him or her.

Video customization is most easily done for animated videos, where parameters of scenes and objects can be easily changed. However, the present invention facilitates customization of non-animated videos as well.

For example, a video featuring a country's flag can be altered so that the flag would correspond to the country in which the user is watching the video, thus enabling advertisers to customize the video in a way that it most appeals to the user.

The present invention provides a method for customizing video based on viewer behaviors, implemented by one or more processors operatively coupled to a non-transitory computer readable storage device, on which are stored modules of instruction code that when executed cause the one or more processors to perform the following steps:

receiving/preparing plurality variations of customized video relate to one video template, wherein each video variation has different features including at least one of: different scenario scene, different characters, different style, different objects displaying plurality of video vibration to plurality of viewers;

tracking viewer behavior while watching the video and after watching the video, wherein the viewers are identified by their profile in relation to real time context parameters;

grading user behavior based on predefined viewers target (behavior) criteria;

training a neural network to select video variants having specific features per each video presentation of a specific customizable video template in relation to viewer profile and context parameters, for maximizing user behavior grading in relation to said video variant.

applying said natural network to a given viewer profile to determine for specific video template the video features for maximizing viewer behavior grading;

streaming the determined a video based on determined video features.

According to some embodiments of the present invention the neural network, is a generic neural network trained for all video templates.

According to some embodiments of the present invention the neural network, is a designated neural network trained for specific video templates.

According to some embodiments of the present invention the method further comprising a generic neural network, trained for video templates, wherein the video to be stream is determined on the combination of features selections from both generic neural network and designated neural network.

According to some embodiments of the present invention the neural network, is a generic personal neural network trained for all video templates.

According to some embodiments of the present invention the method further comprising a generic personal neural network, trained for video templates, wherein the video to be stream is determined on the combination of features selections from both generic neural network and designated neural network.

According to some embodiments of the present invention at least part of the video template is marked as generic at least part of the video template is marked as designated, wherein each video feature is determined according to the respective neural network.

According to some embodiments of the present invention each video feature is determined according to the respective neural network which has the higher statistical significance for said feature, According to some embodiments of the present invention each video feature is determined by the designated neural network in case statistical significance of the designated neural network is above predefined threshold.

According to some embodiments of the present invention the viewer behavior includes, navigating within the website or application, creating contact through the website, using hyperlinks, track of mouse data, viewing time of the video.

According to some embodiments of the present invention the video variation includes a benefit or a prize for the viewer.

The present invention provides a system for customizing video based on users behaviors, comprising a server module and a plurality of household client modules, wherein each of said a server module and plurality of household client modules comprising one or more processors, operatively coupled to non-transitory computer readable storage devices, on which are stored modules of instruction code, wherein execution of said instruction code by said one or more processors implements the function of the said server and client modules:

Video variation generation module for receiving/preparing plurality variations of customized video relate to one video template from a Video variation database, wherein each video variation has different features including at least one of: different scenario, different characters, different style, different objects and displaying plurality of video vibration to plurality of users;

Behavior tracking module for tracking user behavior while watching the video and after watching the video, wherein the users are identified by their profile parameters retrieved from User profile/cluster groups database;

Behavior analyzing module for grading user behavior based on predefined viewers target (behavior) criteria;

neural network module for training a neural network to select video variants having specific features per each video presentation of a specific customizable video template in relation to viewer profile and context parameters, for maximizing user behavior grading in relation to said video variant and for applying said natural network to a given viewer profile to determine for specific video template the video features for maximizing viewer behavior grading;

Video Real time Module streaming the determined a video based on determined video features.

According to some embodiments of the present invention the user behavior includes, navigating within the website or application, creating contact through the website, using hyperlinks, track of mouse data, how long the video was watched.

According to some embodiments of the present invention the neural network, is a generic neural network trained for all video templates;

According to some embodiments of the present invention the neural network, is a designated neural network trained for specific video templates;

According to some embodiments of the present invention the system further comprising a generic neural network, trained for video templates, wherein the video to be stream is determined on the combination of features selections from both generic neural network and designated neural network.

According to some embodiments of the present invention at least part of the video template features is marked as generic at least part of the video template features is marked as designated, wherein each video feature is determined according to the respective neural network.

According to some embodiments of the present invention each video feature is determined according to the respective neural network which has the higher statistical significance for said feature, According to some embodiments of the present invention each video feature is determined by the designated neural network in case statistical significance of the designated neural network is above predefined threshold.

According to some embodiments of the present invention the video variation includes a benefit or a prize for the viewer.

BRIEF DESCRIPTION OF THE SCHEMATICS

The present invention will be more readily understood from the detailed description of embodiments thereof made in conjunction with the accompanying drawings of which:

FIG. 2 is a flowchart depicting the function of the data acquisition module 100, which is configured to obtain at least part of viewer profile information, presentation context parameters, viewer responsiveness, and viewer target definitions, according to one embodiment of the invention.

FIG. 3 is a flowchart depicting the function of the behavior tracking module 200, which monitors and records viewer behavior and actions during and after watching the video, according to some embodiments of the invention.

FIG. 4 is a flowchart depicting the function of the behavior analysis module 300, configured to analyze viewers' attentiveness and responsiveness to specific customized videos, during the video presentation and directly afterwards, according to some embodiments of the invention.

Figure 1:
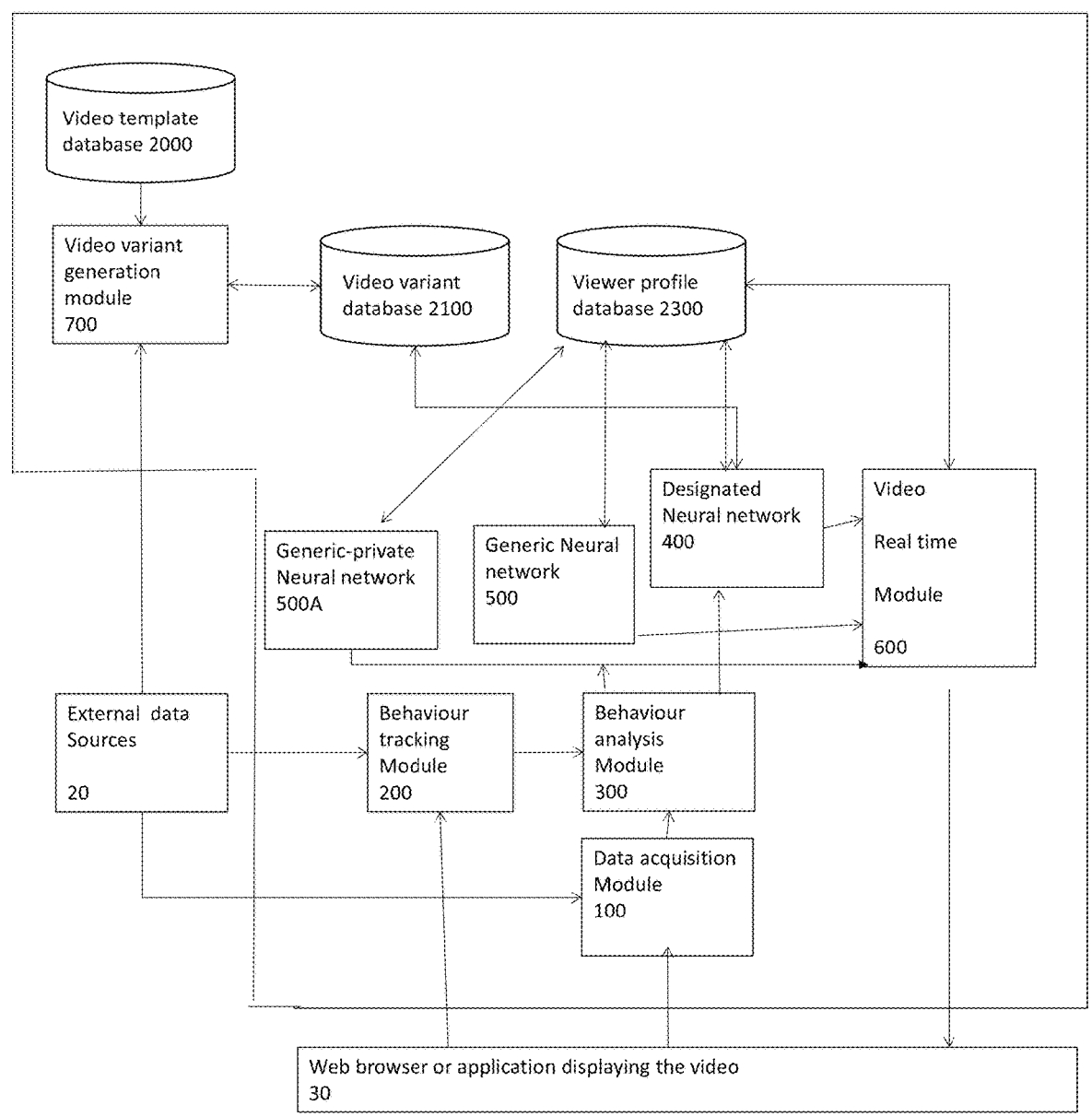
FIG. 1 is a block diagram, depicting the components and the environment of the video customization system, according to some embodiments of the invention.

FIG. 5 presents a flowchart, depicting the function of the designated neural network module 400 during its training stage, according to some embodiments of the invention.

FIG. 6 presents a flowchart, depicting the function of the designated neural network module 400 during its active stage (ensuing the training stage), according to some embodiments of the invention.

FIG. 7 presents a flowchart, depicting the function of the generic neural network module 500 during its training stage, according to some embodiments of the invention.

FIG. 8 presents a flowchart, depicting the function of the generic neural network module 500 during its active stage (ensuing the training stage), according to some embodiments of the invention.

FIG. 9 presents a flowchart, depicting the function of the generic personal neural network module 500A during its training stage, according to some embodiments of the invention.

FIG. 10 presents a flowchart, depicting the function of the generic-personal neural network module 500A during its active stage (ensuing the training stage), according to some embodiments of the invention.

FIG. 11 presents a flowchart depicting the function of the video variant generation module 700 according to one embodiment of the invention. This module is configured to produce a set of video variants from a customizable video template, to train the neural network 400 during its training stage.

FIGS. 12 and 13 jointly present a flowchart depicting the function of the video real-time module 600 according to one embodiment of the invention. This module is configured to produce customized videos according to the video features' customization values selected by the designated and generic neural network modules.

DETAILED DESCRIPTION OF THE VARIOUS MODULES

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Following is a table of definitions of the terms used throughout this application, adjoined by their properties and examples.

| Term | Definition |
| --- | --- |
| Customizable video template, and Customization values | A customizable video template is a digital file, or a group of digital files that define a basic set of video features (e.g. scenes and objects) and a set of customization values that are applicable to the said video features. For example: <br> The basic video template may present a promotion video sequence, including an introduction scene, a sales speech, a vending proposal and a reward proposition. <br> Possible customization values may include, for example: scene selection, selection of objects within each scene, and the narrator's voice. |

-continued

| Term | Definition |
|---|---|
| | Customization values are selected in the present invention so as to maximize the grading of viewers' behavior (e.g.: attentiveness and responsiveness), in view of predefined viewer targets. |
| Promoter | A client (e.g. a person or organization) for whom a customizable video template is produced. |
| Viewer/user profile | A set of characteristics (e.g. gender, age, marital status, preferences and inclinations) pertaining to a viewer of the displayed customizable video. The said profile is comprised from various data sources, and is obtainable through a web browser or an application per each viewer.<br>According to some embodiments, elements within the viewer's profile may be determined according to the said viewer's attentiveness and responsiveness, as described below. |
| Presentation context parameters | Parameters that are relevant to the location and timing of the video presentation, e.g.: time of day, country, outdoor temperature etc. |
| Viewer attentiveness | A set of indicators that describes the viewer's direct reaction and attentiveness to the video during its presentation. Such indicators may include, for example:<br>    whether the user exhibited much mouse and keyboard activity;<br>    whether the user played the video to its completion;<br>    whether the user skipped parts of the video; and<br>    whether the user replayed any parts of the video. |
| Viewer responsiveness | A set of indicators that describes the viewer's responsiveness to the message conveyed in the video, for example:<br>    the viewer's actions (e.g.: clicking a link button or registering for a service); and<br>    the viewer's willingness to participate in a survey or fill a form. |
| Viewer behavior, and behavior grading | The term "viewer behavior" is used throughout this document for the purpose of brevity, to infer both viewer attentiveness and viewer responsiveness.<br>Viewer behavior is graded by the behavior analysis module, in view of the predefined viewer targets. This grading is henceforth referred to as "Behavior grading". |
| Viewer targets | Predefined targets for viewer's behavior toward specific video templates, normally defined by the promoter. Viewer targets include, for example:<br>    selecting hyperlinks,<br>    creating contacts by messages,<br>    initiating a phone call,<br>    registering for a service,<br>    placing reservations or orders, and<br>    purchasing a product or a service. |
| Video features | Features that comprise a video sequence, and are customizable by the present invention to produce maximal behavior grading per each video presentation. Said features include, for example:<br>    scenes (e.g.: a presenter promoting a specific service in a bank);<br>    scenes properties (e.g. narration of text in a high-pitched voice);<br>    scene order (e.g.: said promotion scene, followed by an outdoor hot-air balloon scene);<br>    objects within the scene (e.g. said hot-air balloon); and<br>    object properties (e.g. color of said balloon). |
| Designated/ generic video features | A promoter may define specific video features as designated or generic. This definition dictates whether the said video features would be customizable by the present invention in relation to specific customizable video templates (by the designated neural network), or for all customizable video templates (by the generic neural network) respectively. For example:<br>Designated: The present invention may deduce that men prefer blue background and women prefer pink background for a bank commercial, but deduce the opposite for public service broadcasting.<br>Generic: The present invention may deduce that men prefer blue background, and women prefer pink background for all customizable video templates. |
| Generic/ Designated/ private neural network modules | The term "Neural network" is used henceforth to describe a computational model facilitating a machine learning algorithm.<br>The present invention comprises two separate neural network modules. Both neural networks receive at least part of the following input:<br>    Video variants of customizable video templates;<br>    Viewer profile information;<br>    Presentation context parameters; and<br>    Behavioral grading per each presentation.<br>During a preliminary training stage, the neural network is presented a set of video variants.<br>It receives the behavioral grading as feedback per each presentation. During the training stage, the designated neural network is trained to select an optimal video variant, for a specific customizable video template, so as to produce maximal behavior grading in relation to each presentation of that customizable video template. |

| Term | Definition |
| --- | --- |
| | During the training stage, the generic neural network is trained to select optimal customization values for generic video features per each presentation of any customizable video template, so as to produce maximal behavior grading in relation to any presentation of any customizable video template. |
| | During the training stage, the generic-personal neural network is trained to select optimal customization values for generic video features per each presentation of any customizable video template, so as to produce maximal behavior grading in relation to any presentation of any customizable video template. This generic-personal neural network is trained for specific user |
| | During the ensuing active stage, the designated neural network is configured to utilize its training, and select an optimal video variant for a specific customizable video template, in respect to new viewers and new presentation context parameters. |
| | During the active stage, the generic neural network is configured to utilize its training, and produce optimal video features' customization values in respect to new viewers, new presentation context parameters and new customizable video templates. |
| | During the active stage, the generic-personal neural network is configured to utilize its training a specific user, and produce optimal video features' customization values in respect to new video present to the specific user, new presentation context parameters and new customizable video templates. |
| Viewer feedback | Active feedback provided by the viewer following the presentation of a customized video. |

FIG. 1 is a block diagram depicting the components and the environment of the video customization system 10, and the connectivity between the said components, according to some embodiments of the invention. The video customization system 10 is configured to personalize video sequences, and produce videos that would yield positive and effective results on specific viewers' behavior, i.e. their attentiveness and responsiveness to the presented videos.

The system 10 presents customized videos to human viewers over a computerized application such as a web browser or a dedicated application 30. It monitors and analyzes the viewers' behavior, grades it, and continuously refines the process of video customization and personalization in an effort to maximize the viewers' behavior grading.

In a preferred embodiment, a promoter would provide a configurable video template, comprised of one or more customizable features, alongside a predefined set of viewer targets that are consistent with the message that the video conveys.

For example: a bank may produce a video template, notifying its clients of a new investment counseling service. The video template will comprise a narrator's voice, which may be customized to be that of a man or a woman. The viewer target would require the viewer to click on a link, embedded in the video. The configurable video template and the respective predefined viewer targets are stored on the video template database 2000.

The "External data sources 20" module is a schematic block, presenting multiple sources of input data. Such data includes, for example:
   The promoter's customizable video template;
   Customizable features of the said video template;
   Possible values of customization for the said customizable features;
   A declaration pertaining to each customizable feature, of whether that feature is designated (i.e. to be optimized per a specific customizable video template) or generic (i.e. to be optimized in view of all customizable video templates);
   Viewer targets, as determined by the promoter;
   Elements pertaining to viewers' responsiveness, i.e. whether the viewer has acted upon the message conveyed in the video. For example, a CRM system on the promoter's side may indicate that a specific viewer has placed an order of purchase following the video presentation.

The data acquisition module 100 is configured to obtain at least one customizable video template and at least one respective viewer target definition from a promoter, via the external data sources 20 block.

According to some embodiments, the data acquisition module 100 is configured to interface web browsers or applications 30 upon which the generated video is to be presented, and obtain data regarding the viewer's profile (e.g. name, gender) and the context parameters of the video presentation (e.g. season, time of day). Such information may, for example, be obtained via the use of cookies, or analysis of the viewer's browsing history.

According to some embodiments, the data acquisition module 100 is further configured to obtain viewer's profile data from external sources. For example, the viewer's shopping history and preferences may be obtained from a shop's clients' database.

The behavior tracking module 200 is configured to monitor the viewer's behavior, during and after the video presentation, by taking at least part of the following actions:
   Interfacing web browsers or applications 30 upon which the generated video is presented, and monitoring the viewer's activity;
   Obtaining viewer feedback from forms, selection boxes or the like; and
   Obtaining information from external sources (e.g. from the promoter's systems).

The behavior analysis module 300 analyzes viewers' attentiveness and responsiveness to a particular presented customized video variant. It grades the viewers behavior, taking into account:
   The said attentiveness and responsiveness;
   Fulfillment of predefined viewer targets; and optionally
   Viewer feedback information.

The said grading is henceforth referred to as "behavioral grading".

The designated neural network module 400 and the generic neural network module 500 receive at least part of the following input parameters:
- Video variants of customizable video templates;
- Viewer profile information;
- Presentation context parameters; and
- Behavioral grading per each presentation.

During a preliminary training stage, both neural network modules (400, 500) are presented a set of video variants. They receive the behavioral grading per each presentation as feedback per each presentation.

The designated neural network module 400 is trained to select an optimal video variant, for a specific customizable video template, so as to produce maximal behavior grading in relation to each presentation of that customizable video template.

The generic neural network 500 is trained to select optimal customization values for generic video features per each presentation of any customizable video template, so as to produce maximal behavior grading in relation to any presentation of any customizable video template.

During the ensuing active stage, the designated neural network 400 is configured to utilize its training, and select an optimal video variant for a specific customizable video template, in respect to new viewers and new presentation context parameters.

During the active stage, the generic neural network 500 is configured to utilize its training, and produce optimal video features' customization values in respect to new viewers, new presentation context parameters and new customizable video templates.

The video variant generation module 700 is configured to generate a set of different variants of specific videos from a single customizable video template, during the neural networks' (400, 500) training stage. It receives a customizable video template from the video template database 2000, and applies combinations of customization values to the video template's customizable features. For example, assume the following video template features may be customizable:
- The narrator may be a man or a woman, and
- The scene may shot at day or night time.

The video variant generation module 700 may consequently produce all 4 possible video variants (i.e. man+day, man+night, woman+day, woman+night), or a subset thereof.

The set of video variants produced by the variant generation module 700 serves to train the neural networks (400, 500), as explained further below.

According to one embodiment, the video variant generation module 700 saves the produced set of video variants on the video variant database 2100.

The video real time module 600 is configured to produce the customized video, personalized according to the viewer's profile and the presentation context parameters. It interfaces the web browser or application displaying the video 30, and conveys that video to be presented there.

During the neural networks' (400, 500) training stage, the video real time module 600 will convey a random selection of a video variant produced by the video variant generation module 700 to the web browser or application 30 for display.

During the neural networks (400, 500) active stage, the video real time module 600 will receive at least part of:
- the customizable video template;
- the designated neural network's 400 selection of an optimal customized video variant;
- the generic neural network's 500 selection of optimal video features' customization values;
- the designated neural network's 400 selection of optimal video features' customization values; and
- each customizable feature's attribute as a designated or generic feature.

The video real time module 600 will consequently apply a set of predefined rules relating to statistical parameters, and produce a customized video, personalized for the specific viewer and presentation context parameters according to the said received data.

According to some embodiments, the video real time module 600 propagates the video to the web browser or application 30 as a streaming video, or as a downloadable file.

FIG. 2 is a flowchart depicting the function of the data acquisition module 100, which is configured to obtain at least part of viewer profile information, presentation context parameters, viewer responsiveness, and viewer target definitions, according to one embodiment of the invention.

The data acquisition module 100 obtains a customizable video template from a promoter, and stores the said template on the video templates database 2000 (step 110).

The data acquisition module 100 obtains viewer target definitions from the promoter, per each video template (step 120). Said viewer targets definitions include, for example:
- clicking on hyperlinks;
- creating contacts by messages;
- conducting a phone call;
- engaging in action such as registering for a service;
- performing a reservation or placing an order; and
- purchasing a product or a service.

According to one embodiment, the data acquisition module 100 stores the said viewer target definitions on the video templates database 2000.

The data acquisition module 100 interfaces a web browser or application 30 upon which the generated video is to be presented (step 130). It acquires viewer profile information from the machine hosting the said web browsers or application 30. Such information is acquired, for example, via cookies, user forms, browser history etc. The data acquisition module 100 stores the said acquired viewer profile data on the viewer profile database 2300 (step 140).

According to some embodiments, the data acquisition module 100 interfaces external data sources 20 (e.g.: websites, CRM servers, telephone services etc.). The data acquisition module 100 acquires additional information through the said external sources, including at least part of (step 150):
- user profile parameters (e.g.: viewer's preferences may be obtained by monitoring the viewer's account as a client in an online or physical shop);
- presentation context parameters (e.g.: the weather may be obtained via an online weather server);

According to one embodiment, the data acquisition module 100 obtains presentation context parameters relevant to the location and timing of the video presentation (e.g. time of day, country, outdoor temperature), either from said external sources 20 or said web browsers or application 30 (step 160). The data acquisition module 100 stores the acquired viewer profile data on the viewer profile database 2300.

FIG. 3 is a flowchart diagram of the behavior tracking module 200, according to some embodiments of the invention.

The behavior tracking module 200 interfaces a web browser or application 30 upon which the generated video is presented (step 210). It monitors user behavior during the video presentation (i.e.: attentiveness) (step 220). For example:

- The behavior tracking module 200 determines whether the viewer has seen the presented video to its fruition, or whether they have stopped the presentation in the middle.
- It determines whether the viewer has generated much mouse and keyboard activity, indicating disinterest in the presented video.

The behavior tracking module 200 monitors user actions on the website or application after viewing the video (i.e.: responsiveness) (step 230). It ascertains whether specific targets, as defined above, have been performed by a specific viewer on the web browser or application 30 upon which the generated video is presented. For example, the behavior tracking module 200 may ascertain whether a viewer has clicked a hyperlink to a promoter's landing page.

According to one embodiment, the behavior tracking module 200 interfaces external data sources 20 (e.g.: websites, CRM servers, telephone services etc.) to ascertain whether specific targets, as defined above, have been accomplished in respect to a specific viewer (step 240). For example, the behavior tracking module 200 may ascertain whether a viewer has registered for a specific service, contacted a sales person, or decided to purchase goods following the video presentation, by monitoring the promoter's CRM customers' database.

The behavior tracking module 200 propagates said acquired data to the behavior analysis module, for further analysis (step 250).

FIG. 4 is a flowchart depicting the function of the behavior analysis module 300, configured to analyze viewers' attentiveness and responsiveness to specific customized videos, during the video presentation and directly afterwards, according to some embodiments of the invention.

The behavior analysis module 300 receives viewer attentiveness and responsiveness data from the behavior tracking module 200 (step 310), and receives the viewer target definitions per each video template from the video template database (step 320).

The behavior analysis module 300 analyzes data relating to the viewer's attentiveness to ascertain the viewer's relation to the presented video during presentation (step 330). This data is obtained via the behavior tracking module 200. For example:

- A viewer who exhibits much mouse and keyboard activity may be considered as disinterested in the displayed video.
- A viewer who plays the video to its completion may be considered as interested in the said video.
- A viewer who skips or replays parts of the video may be considered as interested or disinterested in the said parts, respectively.

The behavior analysis module 300 analyzes data relating to the viewer's responsiveness to the presented video, in respect to the defined video targets (step 330). This data is acquired either during the presentation, or after it. For example:

- A viewer may agree to fill up a form or a survey after the presentation.
- A viewer may apply actions on the browser or application presenting the video 30 during the presentation. For example: the viewer may click a hyperlink; navigate to a required web page; leaving a message etc. Such information is obtained via the behavior tracking module 200.
- A viewer may address the promoter by other means (e.g. by phone call), and fulfill predefined viewer targets, such as: purchasing goods or services, placing orders, contacting a representative etc. Such information is obtained via external data sources 20.

The behavior analysis module 300 grades the video variation according to the viewer's behavior, in relation to the predefined viewer targets. This grading is henceforth referred to as the "Behavior grade". (step 340).

According to some embodiments, the method of grading may be configurable according to predefined criteria, to reflect the extent to which a viewer has fulfilled predefined viewer targets. Examples for such criteria may be:

- The number of fulfilled targets (e.g. did the viewer register for updates AND place an order);
- The type of target (e.g.: did the viewer purchase a service, or merely visited the website?)
- The swiftness at which the viewer reacted to the video's message, etc.

According to some embodiments, the behavior analysis module 300 maintains the behavior grading adjoined to the video variation in the video variant database 2100 (step 350).

According to some embodiments, the behavior analysis module 300 is configured to employ a statistical analysis algorithm, to ascertain the effect of each video feature variation on the viewer's attentiveness and responsiveness (step 360). For example: the effect of colors of a presentor's clothes may be negligible for male viewers, but significant for female viewers.

FIG. 5 presents a flowchart, depicting the function of the designated neural network module 400 during its training stage, according to some embodiments of the invention. The designated neural network is trained to select optimal video variants per each presentation of a specific customizable video template. According to some embodiments it is also trained to select optimal video features' customization values per each presentation of the said specific customizable video template.

The designated neural network module 400 receives a set of video variants relating to a specific customizable video template from the video variant generation module 700 (step 410).

The designated neural network module 400 receives input pertaining to a specific video variant (step 420), including at least part of:

- designated video features (e.g. scenes, objects and sounds) comprising the video sequence, that are customizable for specific video templates; and
- customization values that are applied to said video features (pertaining to the examples above: a scene shot at the Eiffel tower, a hot air balloon carrying a printed message, and a male narrator).

The designated neural network module 400 receives input pertaining to the presentation of the said specific video variant (step 430), including at least part of:

- viewer profile information; and
- presentation context parameters

The designated neural network module 400 receives the behavior grading pertaining to the presentation of the specific video variant to specific viewers from the behavior analysis module 300 (step 440).

The designated neural network module 400 undergoes a process of supervised training, to select an optimal video variant for the specific customizable video template, per each presentation. The selected video variant being optimal in the sense that it would produce a maximal behavior grading in relation to specific viewers' profile and presentation context parameters. The supervised training process comprises of at least part of the following steps (step 450):

The designated neural network module 400 receives the behavior grading as feedback in relation to each presentation (i.e. in relation to the video variant, the viewer profile and the presentation context parameters);

the designated neural network module 400 adjusts its network's weighted values according to said feedback; and the designated neural network module 400 selects an optimal video variant, to produce maximal behavior grading in relation to each presentation, according to the specific viewer's profile and the presentation context parameters. For example, selecting combination of features which provide the highest grading.

According to some embodiments, the designated neural network module 400 is trained to select a set of optimal video features' customization values per each presentation (step 460). The said selected set of video features' customization values being optimal in the sense that they would produce a maximal behavior grading in relation to specific viewers' profile and presentation context parameters. The process of selection of optimal video features' customization values comprises of the following steps:

the designated neural network module 400 obtains the said selected optimal video variant per each viewer's profile and presentation context parameters (see step 450, above); and it extracts a set of optimal video features' customization values per specific viewers' profile and presentation context parameters, according to the said selected optimal video variant.

The designated neural network module 400 repeating the same process with all video variants of the said specific customizable video template (step 470).

FIG. 6 presents a flowchart, depicting the function of the designated neural network module 400 during its active stage (ensuing the training stage), according to some embodiments of the invention.

The designated neural network module 400 receives input pertaining to a specific customizable video template (step 470), including at least part of:

Video features, such as: scenes, objects and sounds comprising the video sequence; and Customization values that are selectable or applicable to said video features. Pertaining to the example above, these applicable customization values may include: a set of selectable scenes (e.g. scene shot in Paris or in Rome), a set of selectable objects (e.g. red or blue hot air balloon), and a set of selectable narrator voices (e.g. man, woman or child voices).

The designated neural network module 400 receives input pertaining to the video presentation (step 480), including at least part of:

viewer profile information; and presentation context parameters.

The designated neural network module 400 selects an optimal video variant per each presentation (step 485). The said selection of optimal video variant enables the system to produce maximal behavior grading in relation to each presentation of the said specific video template, in respect to the specific viewer's profile and the presentation context parameters.

According to some embodiments, the designated neural network module 400 is configured to extract, from the said selected optimal video variant, an optimal set of video features' customization values per each presentation of the said specific customizable video template (step 490).

The designated neural network module 400 receives behavior grading from the behavior analysis module 300 as feedback (step 495). It uses this feedback as supervision to iteratively adjust the designated neural network weights, and refine the selection of video features' customization values per each presentation.

FIG. 7 presents a flowchart, depicting the function of the generic neural network module 500 during its training stage, according to some embodiments of the invention. The generic neural network 500 is trained to select optimal video features' customization values per each presentation of any customizable video template.

The generic neural network module 500 receives a set of video variants relating to a specific customizable video template from the video variant generation module 700 (step 510);

The generic neural network module 500 receives input pertaining to a specific video variant, including at least part of (step 520):

generic video features (e.g. scenes, objects and sounds) comprising the video sequence, that are customizable for all customizable video templates; and customization values that are applicable to said video features.

Receiving input pertaining to the video presentation, including at least part of (step 530):

Viewer profile information, and

Presentation context parameters

The generic neural network 500 receives the behavior grading pertaining to the presentation of a video variation to specific viewers from the behavior analysis module 300 (step 540).

The generic neural network 500 repeats the same process with multiple video variants of a specific customizable video template (step 550).

The generic neural network 500 repeats the steps described above, with multiple customizable videos (step 560).

The generic neural network 500 undergoes a process of supervised training, to select a set of optimal video features' customization values per each presentation (step 570). The said supervised training process comprises at least part of the following steps:

receiving the behavior grading as feedback in relation to each presentation (i.e. in relation to the video variant, the viewer profile and the presentation context parameters);

adjusting the weighted values according to said feedback; and selecting optimal video features' customization values, to produce maximal behavior grading in relation to each presentation, according to viewers' profile and presentation context parameters.

FIG. 8 presents a flowchart, depicting the function of the generic neural network module 500 during its active stage (ensuing the training stage), according to some embodiments of the invention.

The generic neural network 500 receives input pertaining to a specific customizable video template, including at least part of:

Video features (e.g. scenes, objects and sounds comprising the video sequence)

customization values that are applicable to said video features (e.g. scene shot at the beach or on a mountain) (step 575

The generic 500 neural network receives input pertaining to the video presentation, including at least part of (step 580):
  viewer profile information, and
  presentation context parameters.

The generic neural network 500 selects an optimal set of video features' customization values per each presentation (step 585). The said selection of optimal set of video features' customization values would utilize the trained generic neural network to produce maximal behavior grading in relation to each presentation, in respect to the specific viewer's profile and the presentation context parameters.

The generic neural network 500 receives behavior grading from the behavior analysis module 300 as feedback, and iteratively adjusts the generic neural network to refine the selection of video features' customization values per each presentation (step 590).

FIG. 9 presents a flowchart, depicting the function of the generic personal neural network module 500A during its training stage, according to some embodiments of the invention. The generic personal neural network 500A is trained to select optimal video features' customization values per each presentation of any customizable video template for specific user.

The generic personal neural network module 500A receives a set of video variants relating to a specific customizable video template from the video variant generation module 700 (step 510A);

The generic personal neural network module 500A receives input pertaining to a specific video variant, including at least part of (step 520A):
  generic video features (e.g. scenes, objects and sounds) comprising the video sequence, that are customizable for all customizable video templates; and
  customization values that are applicable to said video features.

Receiving input pertaining to the video presentation, including at least part of (step 530A):
  Presentation context parameters The generic personal neural network 500A receives the behavior grading pertaining to the presentation of a video variation to specific user from the behavior analysis module 300 (step 540A).

The generic neural network 500 repeats the same process with multiple video variants of a specific customizable video template (step 550).

The generic personal neural network 500A repeats the steps described above, with multiple customizable videos (step 560A).

The generic personal neural network 500A undergoes a process of supervised training, to select a set of optimal video features' customization values per each presentation (step 570A) for specific user. The said supervised training process comprises at least part of the following steps:
  receiving the behavior grading as feedback in relation to each presentation (i.e. in relation to the video variant, and the presentation context parameters);
  adjusting the weighted values according to said feedback; and
  selecting optimal video features' customization values, to produce maximal behavior grading in relation to each presentation, according presentation context parameters for the specific user.

FIG. 10 presents a flowchart, depicting the function of the generic-personal neural network module 500A during its active stage (ensuing the training stage), according to some embodiments of the invention.

The generic personal neural network 500A receives input pertaining to a specific customizable video template, including at least part of:
  Video features (e.g. scenes, objects and sounds comprising the video sequence)
  customization values that are applicable to said video features (e.g. scene shot at the beach or on a mountain) (step 575A) The generic personal 500A neural network receives input pertaining to the video presentation, including at least part of (step 580A):
  presentation context parameters.

The generic neural personal network 500A selects an optimal set of video features' customization values per each presentation (step 585A). The said selection of optimal set of video features' customization values would utilize the trained generic personal neural network to produce maximal behavior grading in relation to each presentation, for the specific user and the presentation context parameters.

The generic personal neural network 500 receives behavior grading from the behavior analysis module 300 as feedback, and iteratively adjusts the generic personal neural network to refine the selection of video features' customization values per each presentation (step 590A).

FIG. 11 presents a flowchart depicting the function of the video variant generation module 700 according to one embodiment of the invention. This module is configured to produce a set of video variants from a customizable video template, to train the neural networks [400, 500] during their training stage.

The video variant generation module 700 obtains a customizable video template from the video templates DB 2000 (step 710).

The video variant generation module 700 receives input pertaining to a specific customizable video template (step 720), including at least part of:
  Video features (e.g. scenes, objects and sounds); and
  Customization values that are applicable to said video features.

The video variant generation module 700 produces a set of video variants relating to said customizable video template, during the neural networks' (400, 500) training stage (step 730).

The video variant generation module 700 propagates said set of video variants to the designated neural network module 400 during the designated neural network's training stage (step 740).

According to one embodiment, the video variant generation module 700 stores the said produced set of video variants on the video variant DB 2100, wherefrom the designated neural network module 400 obtains specific video variants on demand.

The video variant generation module 700 propagates said set of video variants to the generic neural network module 500 during the generic neural network's training stage (step 750).

According to one embodiment, the video variant generation module 700 stores the said produced set of video variants on the video variant DB 2100, wherefrom the generic neural network module 500 obtains specific video variants on demand.

The video real-time module 600 is configured to produce customized videos according to the video features' customization values selected by the designated 400 and generic 500 neural network modules.

Specific video features may be defined by a user or a promoter as designated or generic. This definition dictates whether the said video features would be customizable by the present invention in relation to specific customizable video templates (by the designated neural network), or for all customizable video templates (by the generic neural network) respectively. For example:

Designated: The present invention may deduce that men prefer blue background and women prefer pink background for a bank commercial, but deduce the opposite for public service broadcasting.

Generic: The present invention may deduce that men prefer blue background, and women prefer pink background for all customizable video templates.

Personal: The present invention may deduce that the specific user prefers magenta background, for all customizable video templates.

The video real time module 600 displays a personalized video to a specific viewer. It may be configured to do either one of the following, according to the said declaration of the customizable video features as designated or generic:

When all customizable video features within a specific video template are declared as designated, the video real time module 600 will present the selected video variant from the designated neural network module 400. According to some embodiments, when all customizable video features within a specific video template are declared as designated, the video real time module 600 will generate a personalized video according to the customizable video template and the set of video features' customization values selected by the designated neural network module 400;

When all customizable video features within a specific video template are declared as generic, the video real time module 600 will generate a personalized video according to a customizable video template and set of video features' customization values selected by the generic neural network module 700.

When a specific video template comprises a mix of designated and generic customizable video features, the video real time module 600 will select a video variant that comprises the respective combination of selected video features from the designated and generic neural networks. According to some embodiments of the present invention, when specific video template comprises a mix of designated, generic and generic personal customizable video features, the video real time module 600 will select a video variant that comprises the respective combination of selected video features from the designated, generic and generic personal neural networks.

According to some embodiments of the present invention, when specific video template comprises a mix of designated and generic personal customizable video features, the video real time module 600 will select a video variant that comprises the respective combination of selected video features from the designated and generic personal neural networks The latter scenario may present a contradiction in the selection of the generic video features' values. For example:

Assume the following set of customizable features: (A, B), and the following possible video features' values: (a, a') and (b, b') respectively.

Assume that the designated neural network 400 selects a video variant comprising the values (a, b), while the generic neural network 500 selects the values (a', b').

Assume that 'A' is defined as a designated customizable feature, and 'B' is defined as a generic customizable feature The video real time module 600 will employ a set of predefined rules to ascertain whether to choose the video variant comprising the set of values (a, b) or (a, b') or (a', b'), According to one embodiment, the video real time module 600 will decide which of the set of values to choose according to the extent of each neural network's dataset or based on statistical significance of each neural network result for example FIGS. 12 and 13 jointly present a flowchart depicting the function of the video real-time module 600 according to one embodiment of the invention.

During the system's operation in training mode, the video real-time module 600 receives a randomly selected customized video from the video variant generation module 700 (step 610). It then interfaces the web browser or application 30, to present the said video variant to a viewer (step 620).

During the system's operation in active mode, the video real time module 600 functions as elaborated in the following steps:

It receives the customizable video template, and the definition of video features as designated or generic from the video templates DB 2000 (step 630).

The video real-time module 600 receives a selected video variant from the designated neural network module (step 635).

The video real-time module 600 receives a selected set of video features' customization values per each of the video template's generic video features, from the generic neural network module 700 (step 640).

The video real-time module 600 optionally receives a selected set of video features' customization values per each of the video template's designated video features, from the designated neural network module 400 (step 645).

The video real-time module 600 applies a set of predefined rules, to select the video features' customization values among the said set of designated and generic video features' customization values (step 650).

The video real-time module 600 optionally selects a customized video variant from the video variant generation module 700 according to the said selected video features' customization values (step 655).

The video real-time module 600 optionally generates a customized video according to the said received customizable video template and the said selected video features' customization values (step 660).

According to some embodiments of the present invention each video feature is determined according to the respective neural network which has the higher statistical significance for said feature, According to some embodiments of the present invention each video feature is determined by the designated neural network in case statistical significance of the designated neural network is above predefined threshold.

The video real-time module 600 interfaces the web browser or application 30, to present the personalized video variant. The personalized video may be presented as a stream of video data, or a downloadable file (step 665).

The system of the present invention may include, according to certain embodiments of the invention, machine readable memory containing or otherwise storing a program of instructions which, when executed by the machine, implements some or all of the apparatus, methods, features and functionalities of the invention shown and described herein. Alternatively, or in addition, the apparatus of the present invention may include, according to certain embodiments of the invention, a program as above which may be written in any conventional programming language, and optionally a machine for executing the program such as but not limited to a general-purpose computer which may optionally be configured or activated in accordance with the teachings of the present invention. Any of the teachings incorporated herein may wherever suitable operate on signals representative of physical objects or substances.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

It is appreciated that software components of the present invention including programs and data may, if desired, be implemented in ROM (read only memory) form including CD-ROMs, EPROMs and EEPROMs, or may be stored in any other suitable typically non-transitory computer-readable medium such as but not limited to disks of various kinds, cards of various kinds and RAMs. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally includes at least one of a decision, an action, a product, a service or any other information described herein that impacts, in a positive manner, a problem or objectives described herein; and (b) outputting the solution.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Features of the present invention which are described in the context of separate embodiments may also be provided in combination in a single embodiment.

For example, a system embodiment is intended to include a corresponding process embodiment. Also, each system embodiment is intended to include a server-centered "view" or client centered "view", or "view" from any other node of the system, of the entire functionality of the system, computer-readable medium, apparatus, including only those functionalities performed at that server or client or node.

What is claimed is:

1. A method for customizing video based on behaviors of a plurality of viewers, implemented by one or more processors operatively coupled to a non-transitory computer readable storage device, on which is stored instruction code that when executed cause the one or more processors to perform the following steps:

receiving/preparing plurality variations of customized video related to one customized video template, wherein each customized video variation has different features including at least one of: different scenario scene, different characters, different style, different objects;

displaying a plurality of customized video variations to the plurality of viewers;

tracking behavior of the plurality of viewers while watching the plurality of customized video variations and after watching the customized video, wherein each of the plurality of viewers has a profile and the plurality of viewers are identified by their profile in relation to real time context parameters;

grading behavior of the plurality of viewers based on predefined viewers target (behavior) criteria;

training a neural network to select customized video variants having specific features per each customized video presentation of a specific customized video template in relation to a profile of one of the plurality of viewers and context parameters, for maximizing behavior grading of the one of the plurality of viewers in relation to one of said customized video variants;

applying said neural network to a profile of one of the plurality of viewers to determine for a specific customized video template the customized video features for maximizing behavior grading of the one of the plurality of viewers;

streaming the customized video based on the determined customized video features.

2. The method of claim 1 wherein the neural network, is a generic neural network trained for all customized video templates.

3. The method of claim 1 wherein the neural network, is a designated neural network trained for specific customized video templates.

4. The method of claim 3 further comprising a generic neural network, trained for customized video templates, wherein the customized video to be streamed is determined on the combination of features selections from both generic neural network and designated neural network.

5. The method of claim 1 wherein the neural network, is a generic personal neural network trained for all customized video templates.

6. The method of claim 3 further comprising a generic personal neural network, trained for customized video templates, wherein the customized video to be streamed is determined on the combination of features selections from both generic neural network and designated neural network.

7. The method of claim 4 wherein at least part of the customized video template is marked as generic at least part of the customized video template is marked as designated, wherein each customized video feature is determined according to the respective neural network.

8. The method of claim 4 wherein each customized video feature is determined according to the respective neural network which has the higher statistical significance for said feature.

9. The method of claim 4 wherein each customized video feature is determined by the designated neural network in case statistical significance of the designated neural network is above predefined threshold.

10. The method of claim 1 wherein the behavior of the one of the plurality of viewers includes navigating within the website or application, creating contact through the website, using hyperlinks, track of mouse data, viewing time of the customized video.

11. The method of claim 1 wherein the customized video variation includes a benefit or a prize for the one of the plurality of viewers.

12. A system for customizing video based on behaviors of a plurality of viewers, said system comprising a non-transitory storage device and one or more processing devices operatively coupled to the storage device on which are stored engines of instruction code executable by the one or more processors:

customized video variation generation engine for receiving/preparing plurality variations of customized video relate to one customized video template from a customized video variation database, wherein each customized video variation has different features including at least one of: different scenario, different characters, different style, different objects and displaying a plurality of customized video variation to the plurality of viewers;

behavior tracking engine for tracking behavior of the plurality of viewers while watching the customized video and after watching the customized video, wherein the plurality of viewers have profiles and the plurality of viewers are identified by parameters of their profile retrieved from a viewer profile/cluster groups database;

behavior analyzing engine for grading behavior of the plurality of viewers based on predefined viewers target (behavior) criteria;

neural network engine for training a neural network to select customized video variants having specific features per each customized video presentation of a specific customized video template in relation to a profile of one of the plurality of viewers and context parameters, for maximizing behavior grading of the one of the plurality of viewers in relation to one of said customized video variants and for applying said neural network to the profile of the one of the plurality of viewers to determine for a specific customized video template the customized video features for maximizing behavior grading of the one of the plurality of viewers;

customized video real-time engine for streaming the customized video based on the determined customized video features.

13. The system of claim 12 wherein the behavior of the one of the plurality of viewers includes, navigating within the website or application, creating contact through the website, using hyperlinks, track of mouse data, how long the customized video was watched.

14. The system of claim 12 wherein the neural network, is a generic neural network trained for all customized video templates.

15. The system of claim 12 wherein the neural network, is a designated neural network trained for specific customized video templates.

16. The system of claim 13 further comprising a generic neural network, trained for customized video templates, wherein the customized video to be streamed is determined on the combination of features selections from both generic neural network and designated neural network.

17. The system of claim 13 wherein at least part of the customized video template features is marked as generic at least part of the customized video template features is marked as designated, wherein each customized video feature is determined according to the respective neural network.

18. The system of claim 13 wherein each customized video feature is determined according to the respective neural network which has the higher statistical significance for said feature.

19. The system of claim 13 wherein each customized video feature is determined by the designated neural network in case statistical significance of the designated neural network is above predefined threshold.

20. The system of claim 13 the customized video variation includes a benefit or a prize for the one of the plurality of viewers.

\* \* \* \* \*